United States Patent Office 3,799,889
Patented Mar. 26, 1974

3,799,889
HYDROGENATION AND HYDRODEALKYLATION CATALYST
Vladimir Mikhailovich Gryaznov, Leninskie gory MGU zona L, kv. 11; Viktor Sergeevich Smirnov, Kutuzovsky prospekt 26, kv. 555; Alexandr Petrovich Mischenko, Khersonskaya ulitsa 7, korpus 4, kv. 515; Natalia Vsebolodovna Orekhova, ulitsa Marii Ulyanovoi 9, korpus 1, kv. 95; Boris Petrovich Krivdin, Belyaevo-Bogorodskoe, kvartal 48, korpus 23, kv. 114; Viktoria Petrovna Polyakova, ulitsa Trofimova 15, kv. 201; and Evgeny Mikhailovich Savitsky, ulitsa Dmitria Ulyanova, DNR-3, kv. 13, all of Moscow, U.S.S.R.
No Drawing. Filed Nov. 23, 1970, Ser. No. 92,195
Claims priority, application U.S.S.R., Nov. 27, 1969, 1,375,574, 1,375,575
Int. Cl. B01j 11/12
U.S. Cl. 252—470        8 Claims

ABSTRACT OF THE DISCLOSURE

Hydrogenation and hydrodealkylation catalysts of aromatic hydrocarbons comprising a palladium alloy with molybdenum, containing from 0.1 to 30 percent by weight of molybdenum.

The catalyst can be manufactured in the form of powders, blacks, membranes, foils or tubes and employed in the processes of hydrogenation and hydrodealkylation of aromatic hydrocarbons carried out either separately or simultaneously.

---

The present invention relates to the production of catalysts, and more particularly concerns catalysts for hydrogenation and hydrodealkylation of aromatic hydrocarbons. The invention may be applied in the production of monomers for synthetic materials and other semi-products.

Catalysts industrially used for processing hydrocarbons are in the form of powders, blacks and granules and usually consist of two or more substances or are applied on a support, such as nickel, platinum on aluminum oxide.

Such catalysts cannot be used as membrane catalysts, i.e. selectively permeable to hydrogen and do not permit carrying out hydrogenation and hydrodealkylation processes simultaneously without mixing the starting materials. These processes are better carried out with catalysts in the form of partitions selectively permeable only to hydrogen, os that on one side of the partition there will take place a process with splitting off of hydrogen, and on the other, a process with addition of hydrogen that has penetrated through the partition. Palladium alloys containing at least one other element from group VIII of the Periodic Table and also copper, silver, gold and boron were suggested for such a partition (see U.S. Pats. Nos. 2,824,620; 3,428,476 and 3,439,474)—"A Membrane Catalyst."

The employment of the above-mentioned catalysts showed that they are of sufficient activity and selectivity.

It is an object of this invention to widen the variety of palladium catalysts able to work as a partition permselective to hydrogen and so extend the application of such catalysts. A further object is to improve the heat-resistance of membrane catalysts.

The said and other objects of the invention are achieved by employing catalysts comprising an alloy of palladium with molybdenum. According to the invention the palladium alloy contains from 0.1 to 30 weight percent of molybdenum. More specific compositions are alloys containing from 2 to 15 weight percent of molybdenum.

The said catalysts can be used as usual in the form of powders, blacks or gauzes and also as partitions, for example as membranes, films, foils and tubes permselective to hydrogen, for carrying out conjugated processes.

The introduction of molybdenum into the alloy improves the heat-resistance of the catalyst, important for heat-treatment when regenerating the catalyst.

Pure hydrocarbons or hydrocarbons diluted in a flow of nitrogen, argon or other gases that do not inhibit the applied catalyst may be used in the converting process.

Several examples are presented herein below for a better understanding of the invention. In all the examples the flow rate of vaporized starting materials was 1.8 litre/hour. The analysis of reaction products was carried out on a chromatograph.

EXAMPLE 1

Hydrogenation of benzene

Hydrogenation of benzene to cyclohexane was run at a temperature range of 190–280° C. on a foil comprising palladium alloy containing 2 weight percent of molybdenum. The weight of catalyst was 3.38 g. Apparent contact area is 66.8 cm.² Cyclohexane yields according to temperature are presented in Table I.

TABLE I

| Temperature (° C.): | Cyclohexane, mol percent |
|---|---|
| 190 | 6.18 |
| 208 | 7.65 |
| 225 | 10.1 |
| 245 | 12.8 |
| 280 | 6.3 |

EXAMPLE 2

Hydrogenation of benzene

Hydrogenation of benzene to cyclohexane was run at a temperature range of 95–220° C. on a foil comprising a palladium alloy containing 15 weight percent of molybdenum. The weight of catalyst was 7.05 g., apparent contact area was 62 cm.² Cyclohexane yields according to temperature are presented in Table II.

TABLE II

| Temperature (° C.): | Cyclohexane, mole percent |
|---|---|
| 97 | 26.6 |
| 140 | 30.9 |
| 155 | 42.9 |
| 163 | 49.7 |
| 170 | 50.7 |
| 177 | 53.4 |
| 185 | 62.3 |
| 200 | 72.0 |
| 210 | 84.1 |
| 220 | 71.0 |

EXAMPLE 3

Hydrodealkylation of toluene

Hydroalkylation of toluene to benzene was run at a temperature range of 480–610° C. on a foil comprising a palladium alloy with 2 weight percent of molybdenum. The weight of catalyst was 3.38 g., apparent contact area, 66.8 cm.²

Benzene yields according to temperature are presented in Table III.

TABLE III

| Temperature (° C.): | Benzene, mole percent |
|---|---|
| 480 | 5.0 |
| 500 | 8.8 |
| 517 | 12.5 |
| 527 | 13.3 |
| 547 | 21.3 |
| 586 | 16.2 |

EXAMPLE 4

Hydrodealkylation of toluene

Hydrodealkylation of toluene to benzene was carried out on an air-activated catalyst used in Example 3, comprising a palladium alloy with 2 weight percent of molybdenum. The activation consisted in passing air through the reactor heated to 750° C. for one hour at a flow rate of 2 litre/hour. The catalyst after being blown through with air was treated for two hours at 500° C. with hydrogen fed at a flow rate of 1.8 litre/hour. The reaction was run at a temperature range of 445–590° C. Benzene yields according to temperature are presented in Table IV.

TABLE IV

| Temperature (° C.): | Benzene, mole percent |
| --- | --- |
| 445 | 5.0 |
| 485 | 16.1 |
| 497 | 17.0 |
| 537 | 24.5 |
| 585 | 21.2 |
| 590 | 15.8 |

Comparison between the data of Tables 3 and 4 shows that the described activation of the palladium-molybdenum catalyst doubles the benzene yield from toluene at a temperature of 500° C.

We claim:

1. A catalyst for hydrogenation and hydrodealkylation of aromatic hydrocarbons, comprising a palladium alloy with molybdenum, said alloy being in the form of granules, guazes or powders, the molybdenum content in said alloy being from 0.1 to 30 percent by weight.

2. The catalyst as claimed in claim 1, comprising a palladium alloy containing from 2 to 15 weight percent of molybdenum.

3. The catalyst as claimed in claim 2, comprising an alloy containing 98 weight percent of palladium and 2 weight percent of molybdenum.

4. The catalyst as claimed in claim 2, comprising an alloy containing 85 weight percent of palladium and 15 weight percent of molybdenum.

5. A catalyst for hydrogenation and hydrodealkylation of aromatic hydrocarbons, comprising a palladium alloy with molybdenum, said alloy being in the form of a membrane, film, foil or tube serving as a partition which is permselective only to hydrogen, the molybdenum content in said alloy being from 0.1 to 30 percent by weight.

6. The catalyst of claim 5 wherein said palladium alloy contains from 2 to 15 weight percent of molybdenum.

7. The catalyst of claim 6 wherein said alloy contains 98 weight percent of palladium and 2 weight percent of molybdenum.

8. The catalyst of claim 6 wherein said alloy contains 85 weight percent of palladium and 15 weight percent of molybdenum.

References Cited

UNITED STATES PATENTS

| | | | |
| --- | --- | --- | --- |
| 2,890,114 | 6/1959 | Ruthardt et al. | 75—172 |
| 2,819,162 | 1/1958 | Cohn | 75—72 |
| 3,305,817 | 2/1967 | Doi | 75—72 |
| 1,779,603 | 10/1930 | Kingsbury | 75—172 |

DANIEL E. WYMAN, Primary Examiner

W. J. SHINE, Assistant Examiner

U.S. Cl. X R.

55—16; 252—477 R